United States Patent
Ala-Vannesluoma et al.

(10) Patent No.: US 9,426,841 B2
(45) Date of Patent: Aug. 23, 2016

(54) COMMUNICATION DEVICE SESSION SUPPORT BETWEEN MULTIPLE ACCESS SYSTEMS

(75) Inventors: Markku Ala-Vannesluoma, Kangasala (FI); Mika Joutsenvirta, Ylojarvi (FI)

(73) Assignee: Nokia Technoloiges Oy, Espoo (FI)

( * ) Notice: Subject to any disclaimer, the term of this patent is extended or adjusted under 35 U.S.C. 154(b) by 1141 days.

(21) Appl. No.: 11/964,658

(22) Filed: Dec. 26, 2007

(65) Prior Publication Data

US 2008/0160994 A1  Jul. 3, 2008

Related U.S. Application Data

(60) Provisional application No. 60/882,475, filed on Dec. 28, 2006.

(51) Int. Cl.
| | |
|---|---|
| *H04W 80/04* | (2009.01) |
| *H04W 36/00* | (2009.01) |
| *H04L 12/66* | (2006.01) |
| *H04W 8/26* | (2009.01) |

(52) U.S. Cl.
CPC ............... *H04W 80/04* (2013.01); *H04L 12/66* (2013.01); *H04W 36/0022* (2013.01); *H04W 36/0033* (2013.01); *H04W 8/26* (2013.01)

(58) Field of Classification Search
CPC ..... H04W 8/28; H04W 8/26; H04W 36/0022; H04W 36/0033; H04W 80/04
See application file for complete search history.

(56) References Cited

U.S. PATENT DOCUMENTS

| | | | |
|---|---|---|---|
| 7,907,584 B2 | 3/2011 | Isobe | |
| 2002/0068570 A1* | 6/2002 | Abrol et al. | 455/438 |
| 2006/0072542 A1* | 4/2006 | Sinnreich et al. | 370/351 |
| 2006/0168110 A1 | 7/2006 | Warrier | |
| 2006/0259951 A1* | 11/2006 | Forssell et al. | 726/1 |
| 2007/0189219 A1* | 8/2007 | Navali et al. | 370/331 |
| 2007/0254661 A1* | 11/2007 | Chowdhury et al. | 455/436 |
| 2009/0046679 A1 | 2/2009 | Isobe | |

FOREIGN PATENT DOCUMENTS

| | | |
|---|---|---|
| JP | 2005295332 A | 10/2005 |
| JP | 2006148921 | 8/2006 |
| JP | 2006319859 | 11/2006 |
| RU | 2009128439 A | 12/2007 |

(Continued)

OTHER PUBLICATIONS

Gundavelli and Leung, Localized mobility management using proxy mobile IPv6 draft-gundavelli-netlmm-mip6-proxy-00.txt. NETLMM BOF, Internet draft, Expires May 12, 2006, Cisco Systems, Nov. 8, 2005. XP015048517.

(Continued)

*Primary Examiner* — Jackie Zuniga Abad
(74) *Attorney, Agent, or Firm* — Harrington & Smith

(57) ABSTRACT

The disclosure relates to accessing a communication system. In accordance with the disclosed method a communication device communicating in a first access system based on an address is transferred to a second access system. The communication device sends an indication that the same address is to be used in the second access system, where after, if proxy mobility is available for the address, the same address is used for communications in the second access system.

24 Claims, 3 Drawing Sheets

(56) References Cited

FOREIGN PATENT DOCUMENTS

| WO | WO 03071821 A1 | 8/2003 |
|---|---|---|
| WO | WO-2006088340 A1 | 8/2006 |

OTHER PUBLICATIONS

Narten et al., Neighbor discovery for IP version 6 (IPv6). Network Working Group, Request for Comments: 1970, Category: Standards Track, Aug. 1996. XP015007754.
International Search Report for PCT Application No. PCT/EP2007/063587.
Office Action for Russian Patent Application No. 2009128439/09(039487), dated Oct. 14, 2010.
English translation of Office Action for Russian Patent Application No. 2009128439/09(039487), dated Oct. 14, 2010.
Office Action for Japanese Patent Application No. 2009-541973, dated Sep. 28, 2011.
English translation of Office Action for Japanese Patent Application No. 2009-541973, dated Sep. 28, 2011.
Office Action for Indonesian Patent Application No. W00200901797 dated Sep. 28, 2011.
English translation of Office Action for Indonesian Patent Application No. W00200901797 dated Sep. 28, 2011.
Office Action for Vietnam Patent Application No. 1-2009-01618, dated Jun. 24, 2011.
English translation of Office Action for Vietnam Patent Application No. 1-2009-01618, dated Jun. 24, 2011.
JP Non-Final Office Action dated Jul. 11, 2012 for corresponding JP Patent Application No. 2009-541973.

* cited by examiner

COMMUNICATION DEVICE SESSION SUPPORT BETWEEN MULTIPLE ACCESS SYSTEMS

FIELD OF THE INVENTION

The present invention relates to communications systems wherein a communication device may communicate via a plurality of access systems. In particular, the present invention relates to supporting a session when a communication device is changing from an access system to another.

BACKGROUND

A communication device can be understood as an electronic device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various applications.

A communication system can be seen as a facility that enables communication sessions between two or more entities such as a communication device and/or other nodes associated with the communication system. In a communication system an appropriate access system allows communication devices to access the communication system.

An access to the communications system may be provided by means of a fixed line or wireless communication interface, or a combination of these. A feature of the wireless access systems is that they allow a user thereof to move around without loosing the connection. Thus the wireless systems are typically referred to as mobile systems. It is noted, though, that in certain mobile systems the mobility may be restricted to substantially small areas, for example a house or even a room.

An example of the wireless systems is the public land mobile network (PLMN). The PLMNs are typically based on cellular technology. Examples of the cellular systems include the second generation (2G) GSM (Global System for Mobile) and the third generation (3G) systems such as systems that are based on the third Generation Partnership Project (3GPP). Wireless communications may also be provided by means of other types of systems, such as by access technologies that are added to the existing cellular infrastructures. Non-limiting examples of the additional access technologies include those known as Wimax, Long Term Evolution (LTE) and the wireless local area network (WLAN). A satellite based system is a yet further example of wireless access systems. Wireless access may also be provided by means of short range radio or other wireless links.

A communication system and a compatible communication device typically operate in accordance with a given standard or specification which sets out what the various entities associated with the system are permitted to do and how that should be achieved. For example, the standard or specification may define if a communication device is provided with a circuit switched carrier service or a packet switched carrier service or both. Communication protocols and/or parameters which shall be used for the connection are also typically defined. For example, the manner how the communication device can access the communication system and how communication shall be implemented between communicating devices, the elements of the communication network and/or other communication devices is typically based on predefined communication protocols.

Multi-access refers to ability to use multiple different access networks with a single communications device. The communications device may, for example, be connected to the Internet at first using a WLAN and, when outside the coverage of the WLAN network, using a cellular communications network or another access system, for example an access system based on the Wimax or Long Term Evolution (LTE).

A user of a communication device might appreciate he/she could continue an active session without interruptions, even if the communication session is transferred from an access system to another, for example due to movement of the user. This means, for example, that any applications running in a communication device and/or user of a communications device should not notice any change in the access technology or experience interruptions in the connectivity. Instead, a smooth transfer from a system to the other and continuous support of the mobility features should be provided.

The mobility features between the different access technologies may not, however, be always fully supported. Problems may occur, for example, if a user application, for example an e-mail application, starts an internet protocol (IP) session in a WLAN using for example an IPsec (IP security protocol) tunnel to a 3G network as specified by the 3GPP and then moves out of the coverage area of the WLAN. At that point the underlying communication network system, for example a general packet radio service (GPRS) system, may be used to maintain the e-mail session. However, because of the lack of any IP level mobility support, the session must be closed and re-initiated via the GPRS. Similar situation may occur when a user moves to another access technology.

A proxy mobile internet protocol (PMIP) may be employed for providing mobility for a user. The PMIP is a protocol where a communication device is not provided with any information regarding the mobility features offered by the network. Instead, the communication device operates in a simple IP manner. The simple IP is commonly understood as a reference to solutions where mobility is not offered at the internet protocol (IP) level and the device itself is not running any mobile protocols. The required mobility features are offered by an appropriate network element providing mobile internet protocol (MIP) signalling to a home agent (HA) and tunnelling between a relevant proxy mobile internet protocol (PMIP) entity and the home agent. The home agent functions to store bindings between the home address of the mobile communication device and a care-of address thereof. Based on this information the home agent may then tunnel communications to and from the mobile communication device.

A problematic situation may occur if a normal Mobile IP (MIP) is used. The term normal Mobile IP refers to applications where a client MIP is employed. In such applications the communication device controls signalling and the tunnelling as well. That is, a client MIP is employed such that a mobility management protocol runs in the communication device. Such operation includes tunnelling and causes extra overhead due to the requirement of a further IP header. For example, in the case of voice over internet protocol (VoIP) application the extra IP header might add about 20% to the overhead. Mobile IP also requires implementation of the MIP in a communication device itself, which may not always be possible or desired.

An option for providing mobility is to use a mechanism known as the Proxy MIP (PMIP). In PMIP the network and the IP mobility aspects are completely hidden from the mobile communication device. The PMIP can be used in a single access technology without terminal awareness, for example in Wimax. However, the Proxy mobile internet protocol (PMIP) may not be reliable in communication systems where it is possible to use different access technologies. More particularly, in this scenario a communication device moving from an access technology to another may need to get a new IP address from the network. If the communication device does not know anything about the mobility features offered by the network, an application cannot continue by using the IP session via a new access technology as it does not know if it belongs to the same mobility area than before.

SUMMARY

The embodiments aim to address one of more of the above shortcomings.

In accordance with an embodiment a communications session is provided for a communication device via a first access system and with the aid of a proxy mobility entity, wherein an address is associated with the session. When the communication device transfers to a second access system, an indication can be sent to a network entity that the same address is to be used also in the second access system. The same address can then be assigned for communication via the second access system. The communication device may be made aware that the same address is supported by the different access systems A method in accordance with an embodiment comprises communicating between a communication device and a first access system based on an address, initiating transfer of the communication device to a second access system, sending from the communication device an indication that the same address is to be used in the second access system; and if proxy mobility is available for the address, using the same address for communications in the second access system. In accordance with another embodiment a computer program product is provided. The program product comprises a set of instructions which, when executed by a processor in a node of a communication system cause the node to use an address for a session provided by a first access system, to send an indication that the same address is to be used in a second access system, to if determine if proxy mobility is available for the address, and in response to positive determination to use the same address for communications in the second access system.

A further embodiment provides a communication device configured to use an address in a first access system, to send an indication to a network entity that the same address is to be used in a second access system, to determine if proxy mobility is available for the address, and to use the same address for communication in the second access system.

A further embodiment provides an apparatus for a communication system, comprising an interface for communication with a communication device, an interface for communication with a proxy mobile internet entity, and a controller configured to provide the communication device with information that enables a communication session based on an address in at least two different access systems when proxy mobility is provided for the address.

The communication device may request for information if an address can be used in the second access system. The device may send a request for information if the address is served by a proxy mobile internet entity, or other type of arrangement offering proxy mobility. The sending may comprise adding a parameter to an attach message. A home address may be created and/or assigned for the communication device. The home address may be sued in association with communications via the first access system and the second access system. The indication may be sent during an attach procedure. The attach procedure may comprise an attachment to a third generation access system. The indication may be sent to an address management entity, for example a home agent provided in a gateway.

BRIEF DESCRIPTION OF THE DRAWINGS

Embodiments of the present invention will now be described by way of example only with reference to the accompanying drawings, in which.

DESCRIPTION OF CERTAIN EMBODIMENTS

Figure 1:
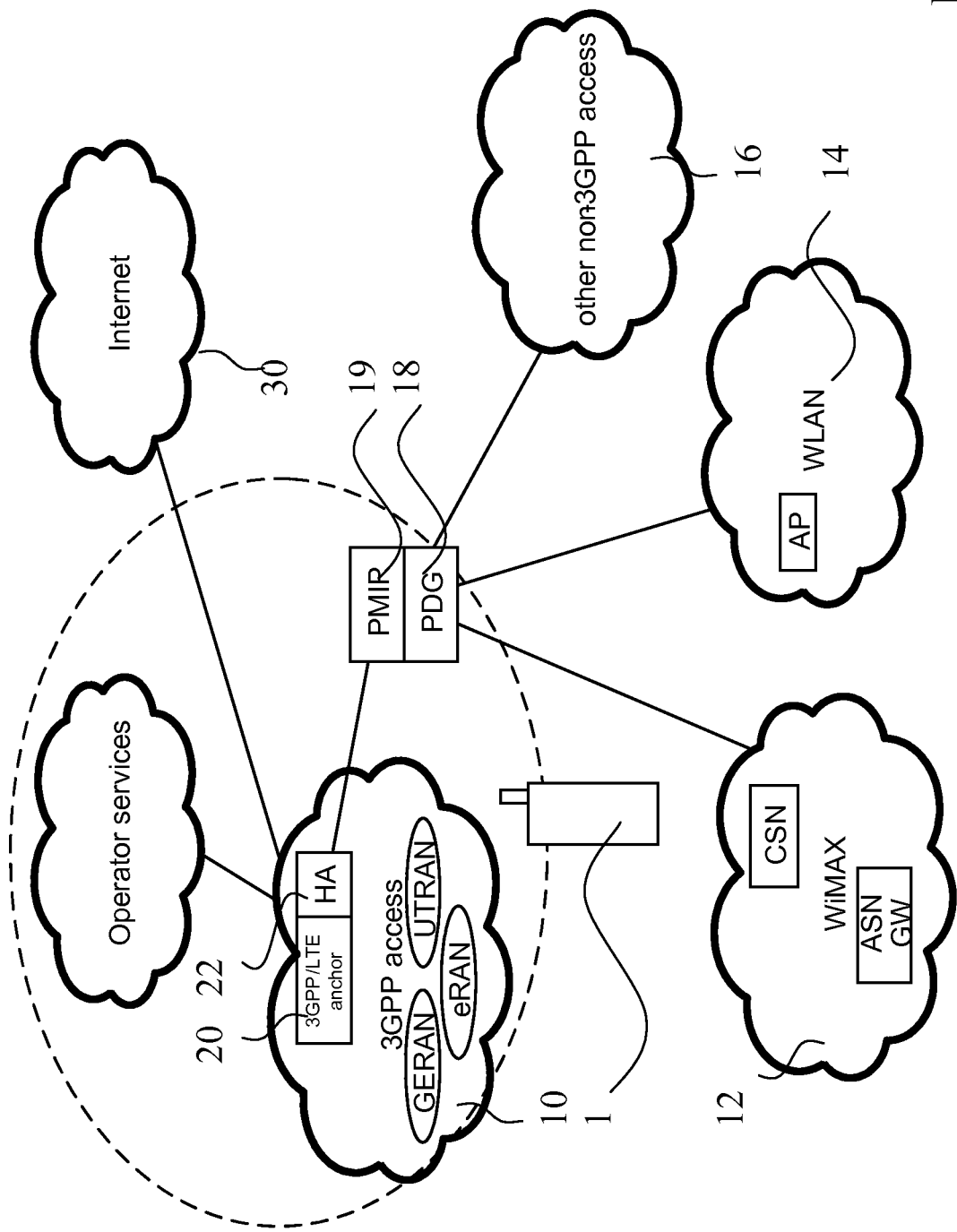
FIG. 1 shows schematically a communication system.

FIG. 1 shows an example of a communication system enabling wireless access for a communication device 1 to a public packet data network 30. In this example the data network is provided by the internet protocol (IP) based Internet. The communication system is shown to comprise a plurality of different access networks 10, 12, 14 and 16. In the following it is assumed that the users, or more particularly, mobile communication devices of the users, may access the communication system via at least two different access systems.

The first access system in FIG. 1 is shown to be provided by a cellular packet access network 10. The cellular access system is associated with a packet switched core network of the cellular network. Although not shown in detail, the core network may comprise network elements of a General Packet Radio Service (GPRS). In such a system the network element interfacing the access network 10 may be provided by a Serving general Packet Radio Service (GPRS) Support Node (SGSN). A network element connecting the packet switched core network to a public packet data network 30 can be provided by a Gateway GPRS Support Node (GGSN).

Another access network is shown to be provided based on WiMAX technology, this being denoted by access system 12. A third access network is provided based on an appropriate wireless local access network (WLAN) technology, this being denoted by access system 14. Further access networks may be provided based on some other non-3GPP based technology, this being denoted by access system 16.

Access systems 12, 14 and 16 are connected to the public data network 30 via the first access system 10 by an appropriate gateway and a proxy mobility entity. In FIG. 1 these are shown to be provided by a packet data gateway (PDG) 18 and proxy mobile Internet Protocol (PMIP) entity 19. The proxy mobility entity is connected to a home agent 22 of the first access system 10.

The proxy mobility entity may be configured to provide mobility for the communication device 1 based on a mechanism that is known as the Proxy MIP (PMIP). As explained above, in PMIP the network and the IP mobility aspects are hidden from the mobile communication device.

Figure 2:
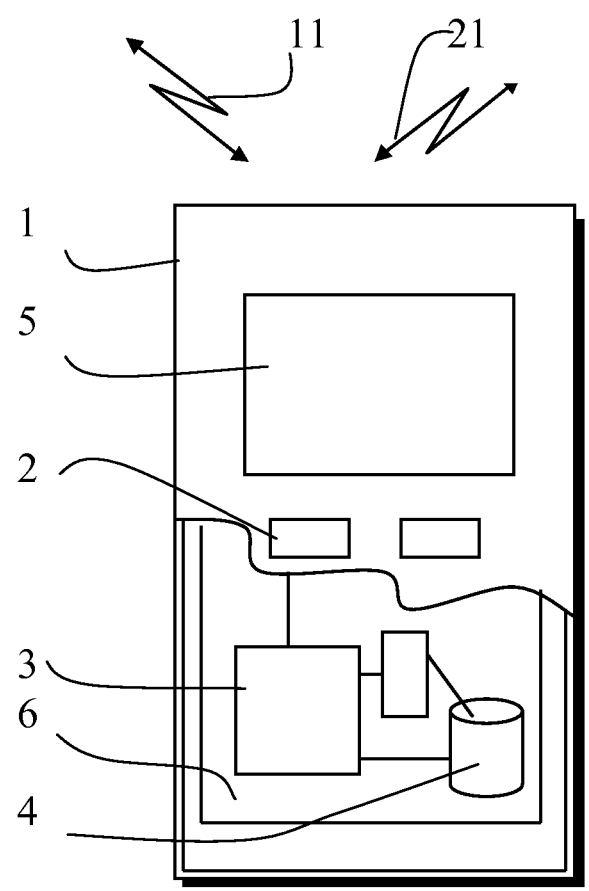
FIG. 2 shows a possible communication device.

Before explaining in detail some exemplifying embodiments, certain general principles of a wireless communication device which can be used in the embodiments is briefly explained with reference to FIG. 2. FIG. 2 shows a schematic partially sectioned view of a wireless communication device 1. A wireless communication device can be used for accessing various services and/or applications via a wireless or radio interface. The device can be used for various tasks such as making and receiving phone calls, for receiving and sending data from and to a data network and for experiencing, for example, multimedia or other content. Non-limiting examples include a mobile station (MS), a portable computer provided with a wireless interface card or other wireless interface facility, personal data assistant (PDA) provided with wireless communication capabilities, or any combinations of these or the like.

A wireless device can typically communicate wirelessly via at least one base station or similar wireless transmitter and/or receiver node. A wireless device may also or alternatively communicate directly with another wireless communication device. Each wireless device may have one or more radio channels open at the same time and may have communication connections with more than one other party. A wireless device is typically able to move within a radio access area and also from one area to another, and hence these devices are often called mobile devices.

An appropriate wireless communication device is provided with required radio transmission elements and controller functions so that it is enabled to communicate wirelessly, and process control instructions it may receive or send. A multi-mode mobile user equipment is able to communicate via a plurality of different access systems. The device 1 may communicate via an appropriate radio interface arrangement of the mobile device. The interface arrangement typically comprises an antenna. The antenna may be arranged internally or externally to the device. A wireless communication device is typically also provided with at least one data processing entity 3 and at least one memory 4 for use in tasks it is designed to perform. The data processing and storage entities can be provided on an appropriate circuit board and/or in one or more chipsets. This feature is denoted by reference 6.

The user may control the operation of the device 1 by means of a suitable user interface such as key pad 2, voice commands, touch sensitive screen or pad, combinations thereof or the like. A display 5, a speaker and a microphone are also typically provided. Furthermore, a wireless device may comprise appropriate connectors (either wired or wireless) to other devices and/or for connecting external devices, for example hands-free equipment, thereto.

The mobile device 1 may be enabled to communicate on a number of different carrier systems. This capability is illustrated in FIG. 2 by the two wireless signals 11 and 21.

FIG. 1 shows how the proxy mobility entity 19 may be provided in a communication system architecture serving the wireless communication device 1 when a home agent (HA) 20 and a 3GPP anchor 22 are collocated in a first access system 10. The 3GPP anchor may be provided, for example by a GGSN. In an embodiment the proxy mobility entity 19 is used to provide mobility between the different access technologies. This may remove the need for extra IP tunneling on the air interface.

When the Proxy Mobile Internet Protocol (PMIP) or similar protocol is used for providing mobility, the mobile communication device 1 transferring between the different access systems can be made aware of this. The mobile device 1 may then request for a home address in appropriate signalling. The request may be for an address that can be used in a plurality of different access systems. For example, such a request may be made in a packet data context configuration message. When non-3GPP access is used, a message such as IKEv2 configuration payload may be used.

The mechanism enables use of proxy mobility entities in a multi-access mobile communication system, this enabling use of communication devices that do not need to be provided with a mobility client application. For example, a communication device that is made aware of the relevant proxy mobility protocol may roam from one access technology to another one and give a notice to an appropriate entity at the network side that it wants to use the same home address that was provided by the old access. By means of this it is possible to avoid changing address details at the application level, and thus use of an open application may be continued smoothly.

For requesting for an IP address, the mobile communication device 1 is configured to signal a message informing an appropriate network entity that it needs to know if a given address is served by a given proxy mobility entity. For example, in a GPRS based system this can be done by adding an extra parameter to a GPRS attach message. In a WLAN-interworking scenario, which may be used for example when a WLAN or Wimax connection to a 3G network is created, an IKEv2 configuration payload message may use "INTERNAL_HOA_ADDRESS" instead of "INTERNAL_IP4_ADDRESS" parameter. In a long term evolution (LTE) scenario a similar parameter may be used in the context activation phase.

Figure 3:
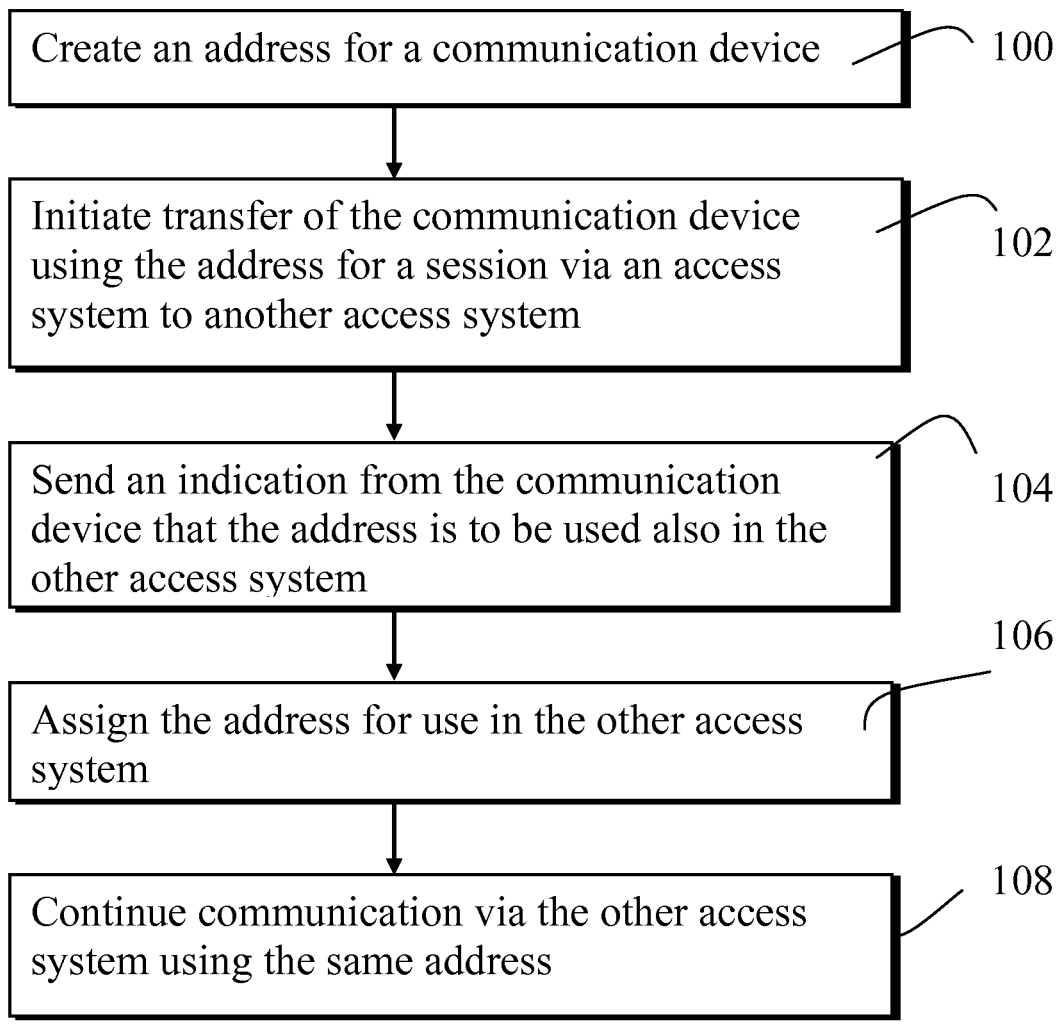
FIG. 3 shows a flowchart in accordance with an embodiment

Once the requested address is provided to the communication device 1, it can determine from this if the network offers mobility. If a network served mobility is available, the communication device 1 can create common IP layer or home address for all access technologies. This stage is denoted by 100 in the flowchart of FIG. 3.

After initiation of handover at 102, the handover sequence may then be, for example, the following. A communication device creates first a WLAN connection to a 3G network using, for example, IKEv2 to get a home address as described above. When the communication device moves out of the coverage area of the WLAN, a GPRS packed data protocol (PDP) context may be created. During the attach procedure, the communication device can indicate to an appropriate element at the network that it wants to use the same home address that was provided to it via the WLAN connection. This may occur at 104 in the flowchart of FIG. 3. The communication device may receive an indication that proxy mobility is provided for the given address, and determine there from that use of the same address is possible.

The network can then assign the same address and use the proxy mobility protocol, for example the PMIP, to offer mobility at 106. This enables the communication device to continue to use the same IP address over a different link layer at 108. The need to re-initiate an active application session during handover can be avoided. Possibility to use the PMIP features avoiding use of tunnelling over the radio link may thus provide further advantage on mechanisms such as the Client MIP.

The mobile communication device may send the indication to a network entity such as the home agent 22, or another entity managing addresses. The home agent functionality may be added to a gateway controller, for example a GGSN or another such gateway. This enables an arrangement where there is no need to have a proxy mobility protocol entity in the gateway, but the home agent functionality can offer a home address (HoA) directly to the communication device.

The same approach can be applied also to other mobility mechanisms, for example the systems providing IPv6 (Internet Protocol version 6) mobility. Separate options may be needed in the messages for requesting a IPv6 home address in the GPRS attach message and IKEv2 configuration payloads.

Message such as 'GPRS/LTE attach' can be extended to provide the option to request for a home address. An indication of a successful home address reservation can be communicated in a reply packet. Similarly, a home address attribute can be added to an IKEv2 configuration payload message, for example as an optional INTERNAL_IP4_ADDRESS.

A mobile communication device may be configured so that is can create a shared IP layer on top of link layers so that a same home address may be provided.

The embodiments may provide a system where the need for mobility tunnelling from the communication device may be avoided. Also, a need for a MIP client implementation in the communication device may be avoided.

The required data processing functions may be provided by means of one or more data processors. Thus any required data processing functions of a communication device may be provided by separate processors or by an integrated processor. For example, data processing may be provided in a central processing unit of a communication device, or distributed across several data processing modules.

An appropriately adapted computer program code product or products may be used for implementing the embodiments, when loaded on an appropriate processor, for example in a processor of the communication device and/or a node of the communication system. The program code means may, for example, cause generation and/or interpretation of the indication, determination if proxy mobility is provided and/or if the same address can be used in different access systems, generation of messages and so forth. In the mobile communication device the program code product can also be configured to determine if a given address is supported by a proxy mobility entity and to request use of the same address in another access system. The program code product for providing the operation may be stored on and provided by means of a carrier medium such as a carrier disc, card or tape. A possibility is to download the program code product to the communication device via a data network.

In the above detailed description reference is, by way of example, made to a multi-access communications device roaming from an access system to another. It is appreciated that embodiments are applicable also in a situation where a communication device loses communications via an access network temporarily. Losing communications via an access network may be due, for example, to the communications device being temporarily moved out of the coverage area of the access network or for capacity reasons.

It is noted herein that while the above describes exemplifying embodiments of the invention, there are several variations and modifications which may be made to the disclosed solution without departing from the spirit and scope of the present invention.

We claim:

1. A method, comprising:
   communicating between a communication device and a first access system using a given address;
   initiating transfer of the communication device to a second access system;
   sending from the communication device an attach message parameter in an attach procedure to a gateway entity associated with the second access system to initiate the transfer, wherein the attach procedure is using an IKEv2 configuration payload message with the attach message parameter indicating that the given address is to be used in the second access system; and
   based on proxy mobility functionality being available for the given address at the gateway entity associated with the second access system, being assigned by the second access system a same address as the given address to perform the communication in the second access system, wherein the first access system comprises a third generation (3G) access system and the second access system comprises a non-3G access system or vice versa.

2. The method as claimed in claim 1, comprising sending from the communication device a request for information if the given address can be used in the second access system.

3. The method as claimed in claim 2, wherein the communication device is a mobile communication device.

4. The method of claim 2, wherein the request comprises a request for information of whether the given address is served by a proxy mobile internet entity.

5. The method of claim 1, comprising receiving at the communication device an indication that network provided mobility is available.

6. The method of claim 1, comprising creating by the communication device an address other than the given address for use in the first and second access systems.

7. The method as claimed in claim 1, comprising sending from the communication device a request for an address other than the given address that can be used in at least two different access systems.

8. The method as claimed in claim 1, wherein the gateway entity is a packet data gateway.

9. The method as claimed in claim 1, wherein the proxy mobility available for the given address at the gateway entity is based on proxy mobile internet protocol.

10. The method as claimed in claim 1, wherein the given address is an internet protocol address, and the method comprising using the internet protocol address over a different link layer to communicate in the second access system.

11. The method as claimed in claim 1, wherein the attach procedure comprises an attachment to a third generation (3G) access system.

12. A non-transitory carrier medium including a computer program product comprising a set of instructions, the instructions executed by a processor in a node of a communication system to cause the node to perform operations comprising:
   using by a communication device a given address for a session provided by a first access system,
   sending an attach message parameter in an attach procedure to a gateway entity associated with a second access system to initiate a transfer of the communication device to the second access system, wherein the attach procedure is using an IKEv2 configuration payload message with the attach message parameter indicating that the given address is to be used by the mobile communication device in the second access system, and
   based on proxy mobility functionality being available for the given address at the gateway entity associated with the second access system, being assigned by the second access system a same address as the given address to continue the session in the second access system, wherein the first access system comprises a third generation (3G) access system and the second access system comprises a non-3G access system or vice versa.

13. The non-transitory carrier medium as claimed in claim 12, further comprising sending a request for information if the given address can be used in the second access system.

14. The non-transitory carrier medium as claimed in claim 12, wherein the gateway entity is a packet data network gateway.

15. The non-transitory carrier medium as claimed in claim 12, wherein the proxy mobility available for the given address at the gateway entity is based on proxy mobile internet protocol.

16. An apparatus, comprising
at least one processor; and
at least one memory including computer program code, where the at least one memory and the computer program code are configured, with the at least one processor, to cause the apparatus to at least:
use a given address in a first access system,
send an attach message parameter in an attach procedure to a gateway entity associated with the second access system to initiate a transfer of the apparatus to the second access system, wherein the attach procedure is using an IKEv2 configuration payload message with the attach message parameter indicating that the given address is to be used in the second access system, and based on proxy mobility functionality for the given address at the gateway entity associated with the second access system, being assigned by the second access system a same address as the given address for communication in the second access system, wherein the first access system comprises a third generation (3G) access system and the second access system comprises a non-3G access system or vice versa.

17. The apparatus of claim 16, wherein the at least one memory including the computer program code is configured, with the at least one processor, to cause the apparatus to send a request for information regarding whether the address can be used in the second access system.

18. The apparatus of claim 16, wherein the apparatus comprises a mobile communication device.

19. The apparatus of claim 18, wherein the given address is an internet protocol address, and the method comprising using the internet protocol address over a different link layer to communicate in the second access system.

20. The apparatus of claim 16, wherein the gateway entity is a packet data network gateway.

21. The apparatus of claim 16, wherein the proxy mobility available for the given address at the gateway entity is based on proxy mobile internet protocol.

22. The apparatus of claim 16, wherein the communication device is a mobile communication device.

23. An apparatus comprising:
at least one processor; and
at least one memory including computer program code, where the at least one memory and the computer program code are configured, with the at least one processor, to cause the apparatus to at least:
receive an indication in an IKEv2 message that a given address is to be used in at least two different access systems;
provide a communication device with information in an attach message in an attach procedure to a gateway entity of a different access network that enables a communication session with the communication device based on the given address of the communication device in the at least two different access systems when proxy mobility is provided a same address as the given address at a gateway entity associated with the at least two different access systems, wherein the at least two different access systems comprise a first access system associated with a third generation (3G) access system and a second access system associated with a non-3G access system.

24. The apparatus of claim 23, wherein the gateway entity is a packet data network gateway and wherein the proxy mobility provided for the given address at the packet data network gateway is based on proxy mobile internet protocol.

* * * * *